United States Patent [19]

Theobald

[11] Patent Number: 4,734,635
[45] Date of Patent: Mar. 29, 1988

[54] MICROPROCESSOR CONTROLLED BATTERY RECONDITIONER FOR PORTABLE RADIO TRANSCEIVERS

[75] Inventor: David J. Theobald, Algonquin, Ill.

[73] Assignee: Motorola, Inc., Schaumburg, Ill.

[21] Appl. No.: 911,692

[22] Filed: Sep. 26, 1986

[51] Int. Cl.$^4$ .................. H02J 7/00; H01M 10/46
[52] U.S. Cl. .................................. 320/13; 455/90
[58] Field of Search .............. 320/13, 14, 39, 40; 455/90

[56] References Cited

U.S. PATENT DOCUMENTS

| | | | |
|---|---|---|---|
| 4,302,714 | 11/1981 | Yefsky | 320/14 X |
| 4,455,523 | 6/1984 | Koenck | 320/59 X |
| 4,558,270 | 12/1985 | Liautaud et al. | 320/2 |
| 4,560,937 | 12/1985 | Finger | 320/39 X |
| 4,575,669 | 3/1986 | Brown | 320/13 |

OTHER PUBLICATIONS

Video Review Mag., Apr. 1984, "Batteries and Power Packs", Meigs, p. 120.
Operating Instructions No. 68P81106C21-0 entitled "KDT Keyboard Data Terminal Battery Charger" 1984 by Motorola, Inc.
Instruction Manual No. 68P81106C36-0 entitled "KDT Keyboard Data Terminal Battery Charger" 1985 by Motorola, Inc.

Primary Examiner—R. J. Hickey
Attorney, Agent, or Firm—Rolland R. Hackbart

[57] ABSTRACT

Unique battery reconditioning circuitry is described that may be advantageously utilized in a portable radio transceiver (100). Reconditioning is initiated by a microcomputer (120) in response to a pre-selected key sequence entered by way of a keyboard (114). The microcomputer (120) turns on a voltage switch (136) to deep discharge a Ni-Cad battery (118) and uses a voltage detector (140) to monitor the voltage Vb of the battery (118). The battery (118) is discharged from a nominal 7.5 V to 6 V in approximately two hours. The battery voltage Vb is converted to a digital value by the voltage detector (140). During the reconditioning process, the microcomputer (120) compares the digital value of the battery voltage Vb to a stored predetermined value to determine that the battery (118) has been discharged to 6 V. Once the battery (118) reaches 6 V, the reconditioning process is terminated and the portable radio transceiver (100) is turned off. The battery reconditioning circuitry of the present invention may be advantageously utilized in a variety of applications where portable equipment is operated from rechargeable batteries.

9 Claims, 2 Drawing Figures

MICROPROCESSOR CONTROLLED BATTERY RECONDITIONER FOR PORTABLE RADIO TRANSCEIVERS

BACKGROUND OF THE INVENTION

The present invention is generally related to battery reconditioners and more particularly to an improved microprocessor controlled battery reconditioner for use in battery-operated radio transceivers.

In the prior art, the battery-operated portable equipment often used nickel-cadmium ("Ni-Cad") batteries. Ni-Cad batteries are subject to a so-called "memory effect" that is induced by uniform shallow cycles of discharging and charging. For example, if the battery is operated so that it repeatedly delivers 50% of its full capacity and then is recharged, the battery may show sharp decrease in its ability to deliver proper battery voltage when being operated beyond 50% of full capacity. This memory effect exhibited by Ni-Cad batteries can be eliminated by deep discharging or reconditioning the battery. Some prior art battery chargers include a switch selectable deep discharge cycle after which the battery is then re-charged. However, none of the prior art battery-operated equipment includes a battery reconditioner that is microprocessor controlled and user selectable.

SUMMARY OF THE INVENTION

Accordingly, it is an object of the present invention to provide an improved microprocessor controlled battery reconditioner for battery-operated portable equipment.

It is another object of the present invention to provide an improved microprocessor controlled battery reconditioner for battery-operated portable equipment that is user selectable.

Briefly described, the present invention encompasses battery reconditioning circuitry for portable equipment including a rechargeable battery producing a voltage and a keyboard having a plurality of actuable keys. The battery reconditioning circuitry includes detecting circuitry coupled to the battery for sensing the magnitude of the battery voltage; switching circuitry for applying the battery voltage to at least a portion of the portable equipment in response to an enable signal; control circuitry coupled to the detecting circuitry, switching circuitry and keyboard for producing the enable signal in response to actuation of a pre-selected sequence of keys, comparing the sensed magnitude of the battery voltage to a predetermined minimum voltage magnitude and disabling said switching circuitry when the sensed magnitude of the battery voltage is substantially the same as the predetermined minimum voltage magnitude, whereby the battery is deep discharged to the predetermined minimum voltage.

DESCRIPTION OF THE PREFERRED EMBODIMENT

Figure 1:
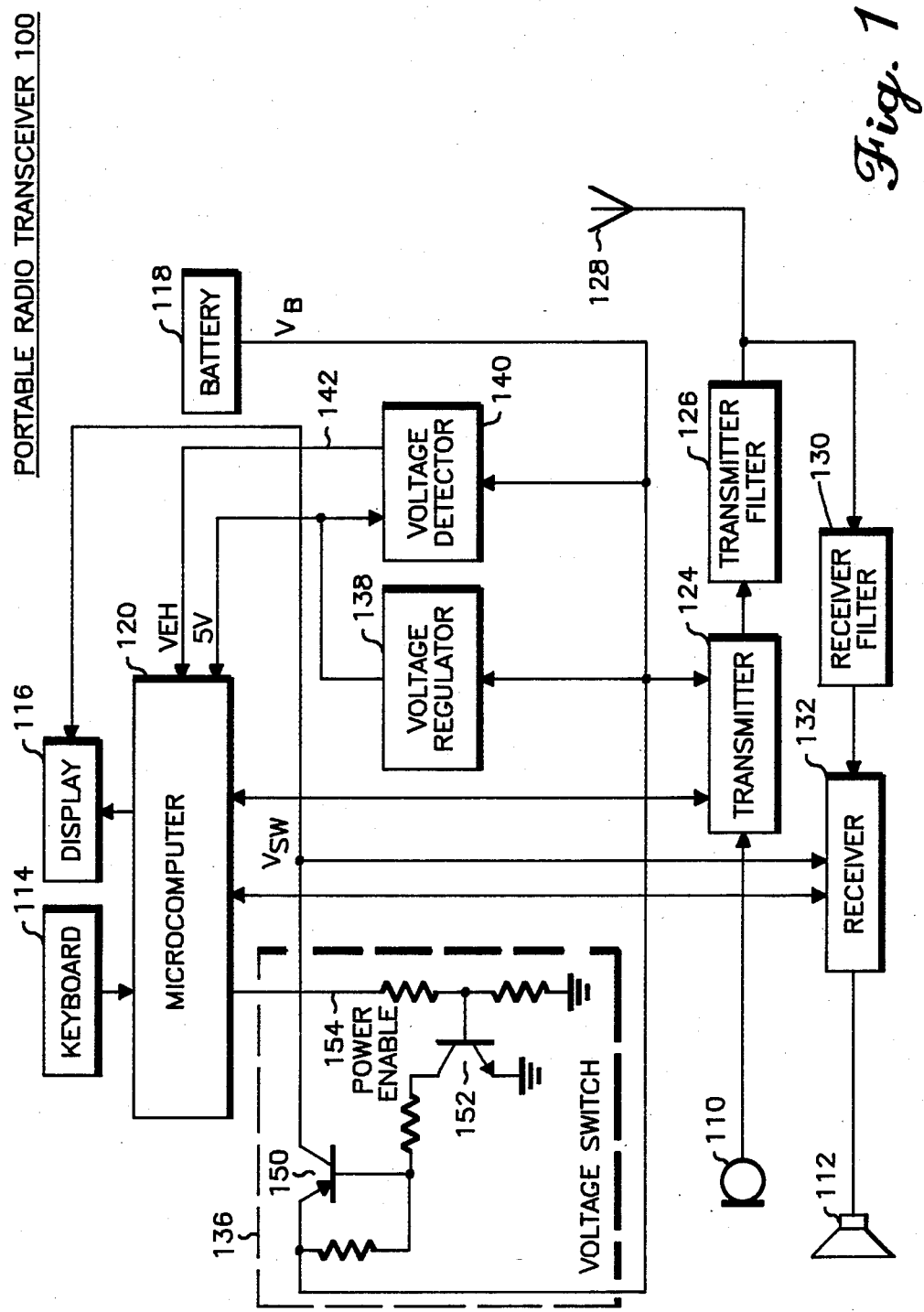
FIG. 1 is a block diagram of a portable radio transceiver embodying the present invention.

In FIG. 1, there is illustrated a portable radio transceiver 100 embodying the present invention. In the preferred embodiment, transceiver 100 is a portable cellular telephone which may be used to place and receive telephone calls in cellular radiotelephone systems currently in use in the United States.

Portable radio transceiver 100 in FIG. 1 includes a keyboard 114, display 116, microphone 110, speaker 112, battery 118, voltage switch 136, 5 V voltage regulator 138, voltage detector 140, transmitter 124, transmitter filter 126, receiver filter 130, receiver 132, antenna 128 and microcomputer 120. Voltage detector 140 in FIG. 1 may be a commercially available analog-to-digital converter (such as a Motorola type MC14442 converter) whose output, the VEH signal 142, corresponds to the digitized magnitude of battery voltage Vb. In the preferred embodiment, microcomputer 120 is a Motorola type 68HC11 microcomputer, and voltage detector 140 is the analog-to-digital converter included in the Motorola type 68HC11 microcomputer. Voltage switch 136 may be implemented with transistors 150 and 152 which are turned on and off in response to a binary one state and binary zero state, respectively, of the power enable signal 154. When turned on, transistor 150 applies switched voltage Vsw to receiver 132 and display 116. All other blocks of portable radio transceiver 100 may be implemented by corresponding conventional circuitry shown and described in Motorola instruction manual number 68P81046E60, entitled "DYNATAC Cellular Portable Telephone", and in U.S. Pat. No. 4,486,624 (incorporated herein by reference). Motorola instruction manual number 68P81046E60 may be obtained from the Service Publications Department of Motorola, Inc., 1301 East Algonquin Road, Schaumburg, Ill. 60196, or from Motorola C & E Parts, 1313 East Algonquin Road, Schaumburg, Ill. 60196.

According to the present invention, voltage detector 140 and voltage switch 136 may be used by microcomputer 120 to control reconditioning of battery 118. Battery 118 is preferably a Ni-Cad battery made up of six 1.25 V cells to provide a voltage nominal Vb of 7.5 V. Since Ni-Cad batteries are subject to a memory effect after repeated shallow cycles of discharging and charging, battery 118 must be reconditioned when the user finds that transceiver operation is limited to approximately two hours or less. Reconditioning is preferably initiated by entering a pre-selected sequence of keys with keyboard 114. The pre-selected key sequence may be any suitable sequence, such as, for example, 0-4-6-SND, where 0-9 are numerical keys and SND is the send key. Upon detection of the pre-selected key sequence, microcomputer 120 executes the process of the flow chart in FIG. 2.

During the reconditioning process of the present invention, microcomputer 120 turns on voltage switch 136 to load battery 118 and uses voltage detector 140 to monitor voltage Vb of battery 118. A deep discharge of battery 118 is indicated by a voltage Vb of 6 V. Battery 118 is discharged to 6 V in approximately two hours. During the reconditioning process, microcomputer 120 compares the digitized magnitude of the VEH signal 142 to a stored predetermined number to determine when battery 118 has been discharged to 6 V. Once battery 118 reaches 6 V, microcomputer 120 terminates the reconditioning process and then turns off transceiver 100.

Figure 2:
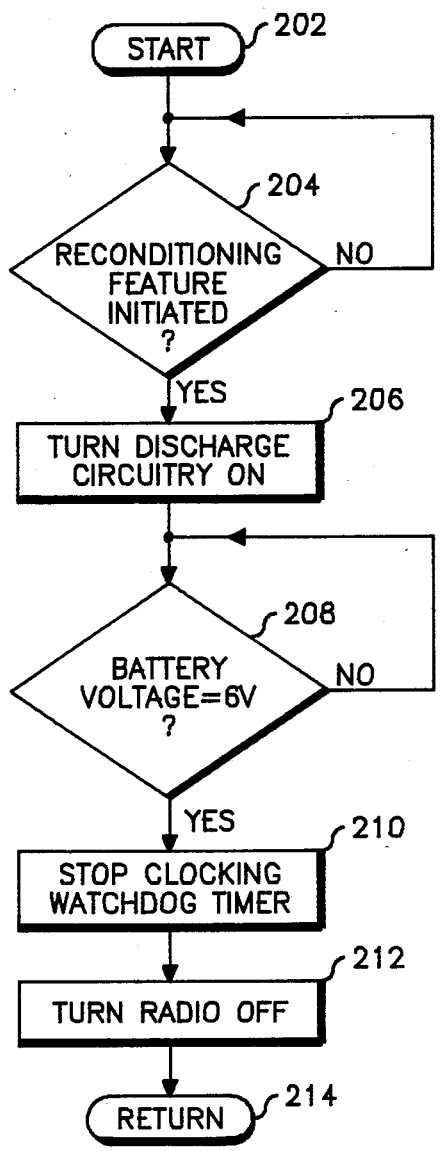
FIG. 2 is a flow chart for the process used by the portable radio transceiver in FIG. 1 for reconditioning its rechargeable battery.

The reconditioning process of the present invention is illustrated in more detail by the flow chart in FIG. 2.

The flow chart in FIG. 2 provides a detailed description of the process steps to be executed by microcomputer 120. The coding of the process steps of the flow chart into instructions of a suitable commercially available microcomputer (e.g. the Motorola type 68HC11 microcomputer) is a mere mechanical step for a routineer skilled in the programming art.

The flow chart in FIG. 2 is entered at START block 202 and proceeds to decision block 204 where microcomputer 120 determines if the reconditioning feature has been selected. As previously described, the reconditioning feature is preferably initiated by a pre-selected key sequence. Alternatively, the reconditioning feature may also be automatically initiated by microcomputer 120 upon determining that the average time of use before recharging has dropped below a predetermined time, such as, for example, two hours. If the reconditioning feature has not been selected, NO branch is taken from decision block 204 to wait for the pre-selected key sequence. If the reconditioning feature has been initiated by entry of the pre-selected key sequence, YES branch is taken to block 206 where the discharge circuitry is turned on. In order to discharge battery 118, the power enable signal 154 is switched to a binary one state turning on transistors 150 and 152. As a result, the voltage Vsw is applied to receiver 132 and display 116. Other circuitry including, for example a switchable load may also be used to discharge battery 118.

Next, at decision block 208, the voltage Vb of battery 118 is monitored by microcomputer 120 to determine when it reaches 6 V. If voltage Vb has not reached 6 V, No branch is taken to continue to wait. When voltage Vb reaches 6 V, YES branch is taken to block 210. At block 210, clocking of the watchdog time is stopped and a binary zero state of the power enable signal 154 is generated to shut voltage switch 136 off. Next, at block 212, transceiver 100 is turned off. Thereafter, program control returns at block 214 and microcomputer 120 may be placed in a sleep mode or turned off.

In summary, unique battery reconditioning circuitry has been described that may be advantageously utilized in portable radio transceivers. The battery reconditioning process of the present invention is preferably initiated by entry of a pre-selected key sequence. During the reconditioning process, the battery is deeply discharged by turning on a voltage switch and applying power to selected circuitry of the portable radio transceiver. Upon completion of the deep discharge cycle, the portable radio transceiver is turned off. In other embodiments, the deep discharge cycle may be automatically initiated under microcomputer control.

I claim:

1. A portable radio, comprising in combination:
   a rechargeable battery producing a predetermined nominal voltage and having a predetermined minimum voltage when deep discharged;
   a keyboard having a plurality of actuable keys;
   a radio receiver;
   a radio transmitter; and
   battery reconditioning circuitry comprising:
   detecting means coupled to the battery for sensing the magnitude of the battery voltage;
   switching means for applying the battery voltage to at least a portion of one of the radio receiver and radio transmitter in response to an enable signal;
   control means coupled to said detecting means, switching means and keyboard for producing the enable signal in response to actuation of a pre-selected sequence of keys, said control means comparing the sensed magnitude of the battery voltage to a predetermined minimum voltage magnitude and disabling said switching means when the sensed magnitude of the battery voltage is substantially the same as the predetermined minimum voltage magnitude, whereby the battery is deep discharged to the predetermined minimum voltage.

2. The portable radio according to claim 1, wherein said detecting means includes analog-to-digital converter means for converting the battery voltage to a digital representation thereof.

3. The portable radio according to claim 1, wherein said switching means includes transistor means responsive to the enable signal for applying the battery voltage to said radio receiver.

4. The portable radio according to claim 1, wherein said control means includes microcomputer means.

5. The portable radio according to claim 4, wherein said detecting means includes analog-to-digital converter means for converting the battery voltage to a digital representation thereof.

6. A method of reconditioning a rechargeable battery in portable radio, the battery producing a predetermined nominal voltage and having a predetermined minimum voltage when deep discharged, and the portable radio further including a receiver, a transmitter and a keyboard having a plurality of actuable keys, said method comprising the steps of:
   sensing the magnitude of the battery voltage;
   switchably applying the battery voltage to at least a portion of one of the radio receiver and radio transmitter in response to an enable signal;
   producing the enable signal in response to actuation of a pre-selected sequence of keys
   comparing the sensed magnitude of the battery voltage to a predetermined minimum voltage magnitude and removing the battery voltage from said at least a portion of one of the radio receiver and radio transmitter when the sensed magnitude of the battery voltage is substantially the same as the predetermined minimum voltage magnitude, whereby the battery is deep discharged to the predetermined minimum voltage.

7. A portable radio, comprising in combination:
   a rechargeable battery producing a predetermined nominal voltage and having a predetermined minimum voltage when deep discharged;
   a keyboard having a plurality of actuable keys;
   a radio receiver;
   a radio transmitter; and
   battery reconditioning circuitry comprising:
   detecting means coupled to the battery for sensing the magnitude of the battery voltage and converting the battery voltage to a digital representation thereof;
   transistor switching means for applying the battery voltage to at least one of the radio receiver and radio transmitter in response to an enable signal;
   computer processing means coupled to said detecting means, switching means and keyboard for producing the enable signal in response to actuation of a pre-selected sequence of keys, said computer processing means comparing the sensed magnitude of the battery voltage to a predetermined minimum voltage magnitude and disabling said switching means when the sensed magnitude of the battery voltage is substantially the same as the predetermined minimum voltage magnitude, whereby the battery is deep discharged to the predetermined minimum voltage.

8. The portable radio according to claim 7, wherein said detecting means includes analog-to-digital converter means for converting the battery voltage to the digital representation thereof.

9. The portable radio according to claim 7, wherein said switching means includes transistor means responsive to the enable signal for applying the battery voltage to said radio receiver.

* * * * *